United States Patent [19]
Carrieri et al.

[11] Patent Number: 6,060,710
[45] Date of Patent: May 9, 2000

[54] INFRARED MUELLER MATRIX DETECTION AND RANGING SYSTEM

[75] Inventors: Arthur H. Carrieri, Abingdon; Jerold R. Bottiger, Aberdeen; David J. Owens; Erik S. Roese, both of Baltimore, all of Md.

[73] Assignee: The United States of America as represented by the Secretary of the Army, Washington, D.C.

[21] Appl. No.: 09/226,631

[22] Filed: Dec. 21, 1998

[51] Int. Cl.[7] .................................................. G01J 5/00
[52] U.S. Cl. .......................................................... 250/338.1
[58] Field of Search ........................... 250/338.1–338.5, 250/341.1–341.8, 342–353, 354.1; 356/318, 432, 432 T, 364–370; 73/655

[56] References Cited

U.S. PATENT DOCUMENTS

| | | |
|---|---|---|
| 4,306,809 | 12/1981 | Azzam . |
| 4,884,886 | 12/1989 | Salzman et al. . |
| 4,953,980 | 9/1990 | DeVolk et al. . |
| 5,241,179 | 8/1993 | Carrieri . |
| 5,247,176 | 9/1993 | Goldstein . |
| 5,631,469 | 5/1997 | Carrieri et al. . |
| 5,633,711 | 5/1997 | Nelson et al. . |
| 5,659,391 | 8/1997 | Carrieri . |
| 5,708,503 | 1/1998 | Carrieri . |

*Primary Examiner*—K. P. Hantis
*Attorney, Agent, or Firm*—Edward L. Stolarun; Vincent J. Ranucci; Ulysses John Biffoni

[57] ABSTRACT

An apparatus for remotely sensing and identifying chemical and biological materials comprising an interrogation component having a first and second infrared radiation source providing a predetermined exciting energy and a predetermined referencing energy, a collection component for collecting backscattering radiation, an optical analysis component for converting the collected backscattered radiation into Mueller matrix elements, a filter component for pattern recognition from the Mueller matrix for specific predetermined materials and a comparison component for determining the presence of specific predetermined materials. A method for identifying chemical and biological materials is disclosed.

13 Claims, 6 Drawing Sheets

TACTICAL MUELLER MATRIX
SENSING AND RANGING

INFRARED MUELLER MATRIX DETECTION AND RANGING SYSTEM

GOVERNMENT INTEREST

The invention described herein may be manufactured, licensed, and used by or for the U.S. Government.

BACKGROUND OF THE INVENTION

1. Field of the Invention

The present invention relates to an active remote sensing system. More particularly, the present invention identifies chemical and/or biological materials (CBMs) at a distance by interrogating the materials with infrared laser light. Most particularly, the device and method of the present invention interrogate CBMs with modulated polarized infrared laser light, collect backscattered polarized infrared laser radiation, electronically record the information from the collected polarized infrared radiation, and mathematically analyze the information to identify the CBMs. Additionally, the device and method may determine the distance to the CBMs.

2. Brief Description of the Related Art

Distant detection and classification of chemical and/or biological materials (CBMs) or contaminates is desirable, especially for military operations. Long range detection and classification eliminate health hazards and coordination problems on a battlefield. Once the presence of a particular CBM is known at a location, preventive measures may be taken prior to entering the area.

Mueller matrices are mathematical calculations and representations of irradiated materials. U.S. Pat. Nos. 4,306,809 (Azzam), 4,953,980 (DeVolk et al.), 4,884,886 (Salzman et al.), 5,247,176 (Goldstein), 5,631,469 (Carrieri et al.), 5,659,391 (Carrieri), and 5,708,503 (Carrieri) disclose many aspects of passive and active systems which process and transform scattergrams into Mueller elements.

Those skilled in the practice of nepholometry and photopolarimery typically use back-inversion methods that correlate the Mueller elements to the geometry and/or physical properties of the interrogated compound or scatterer. The Mueller matrix instrument has a linear polarizer and a modulated PEM positioned in the transmitted beam, and a plurality of modulated PEM's and another linear polarizer positioned in the received beam. This combination of optical elements is referred to as a Mueller matrix spectrometer, MMS.

In view of the foregoing, improvements in CBM identification have been desired. There is a need for selective CBM identification and improved efficiency of using Mueller matrix elements in CBM identification. Additionally, it has been desired to provide the location of the identified CBMs.

SUMMARY OF THE INVENTION

The present invention provides an apparatus for remotely sensing and identifying chemical and biological materials comprising an interrogation component having a first infrared radiation source capable of irradiating biological or chemical materials, the first infrared radiation source set at a predetermined exciting energy to said material's vibrational bands wherein the exciting energy is capable of vibrationally exciting said materials, the interrogation component further having at least a second infrared radiation source capable of irradiating said materials, the second infrared radiation source set at a predetermined referencing energy to said material's vibrational bands wherein the referencing energy is not capable of vibrationally exciting said materials; a collection component, the collection component capable of collecting backscattering radiation from said materials when said materials are irradiated with either the exciting energy or referencing energy; an optical analysis component, the optical analysis component capable of converting the collected backscattered radiation into Mueller matrix elements; a filter component capable of filtering pattern recognition from the Mueller matrix for specific predetermined materials; and, a comparison component capable of receiving the pattern recognition from the filter component and determining the presence of specific predetermined materials.

The present invention further provides a method for identifying chemical and biological materials comprising the steps of providing an apparatus for remotely sensing and identifying chemical and biological materials comprising an interrogation component having a first infrared radiation source capable of irradiating biological or chemical materials, the first infrared radiation source set at a predetermined exciting energy to said material's vibrational bands wherein the exciting energy is capable of vibrationally exciting said materials, the interrogation component further having at least a second infrared radiation source capable of irradiating said materials, the second infrared radiation source set at a predetermined referencing energy to said material's vibrational bands wherein the referencing energy is not capable of vibrationally exciting said materials, a collection component, the collection component capable of collecting backscattering radiation from said materials when said materials are irradiated sequentially with the exciting energy or referencing energy, an optical analysis component, the optical analysis component capable of converting the collected backscattered radiation into Mueller matrix elements, a filter component capable of filtering pattern recognition from the Mueller matrix for specific predetermined materials, a comparison component capable of receiving the pattern recognition from the filter component and determining the presence of specific predetermined materials; irradiating a surface possibly containing said materials with the first and second radiation sources; collecting backscattered radiation from the irradiated surface; converting the backscattered radiation into Mueller matrix elements; recognizing patterns within the Mueller matrix for specific predetermined materials; and, mathematically determining the presence of the specific predetermined materials from the pattern recognition.

DETAILED DESCRIPTION OF THE PREFERRED EMBODIMENTS

The present invention irradiates chemical and/or biological materials (CBMs) with infrared laser beams that are polarization-modulated, at wavelengths that are absorbing and alternately non-absorbing to the CBMs. The polarization modulation is produced in the incident and backscattered laser beams by photoelastic modulators (PEMs) that comprise ZnSe crystals. The PEMs require the proper orientation, and other optics, which together with their modulation frequencies comprise the photopolarimeter instrument. The present invention generates the Mueller matrix of the CBMs in backscattered light. The Mueller matrix provides a complete optical description of the CBMs in elastic scattering, having all of the physical and geometrical information on the CBMs contained in the Mueller matrix. Mueller matrix elements are measured in the direction of beam backscattering at $CO_2$ laser energies that activate and deactivate molecular vibration modes within a targeted CBM. The differential-elements are collected by the present invention, with the data filtered for detection features of the CBMs for detection. With the present invention, real-time identification of the detected CBMs, as aerosols or surface contaminants, is possible.

Figure 1:
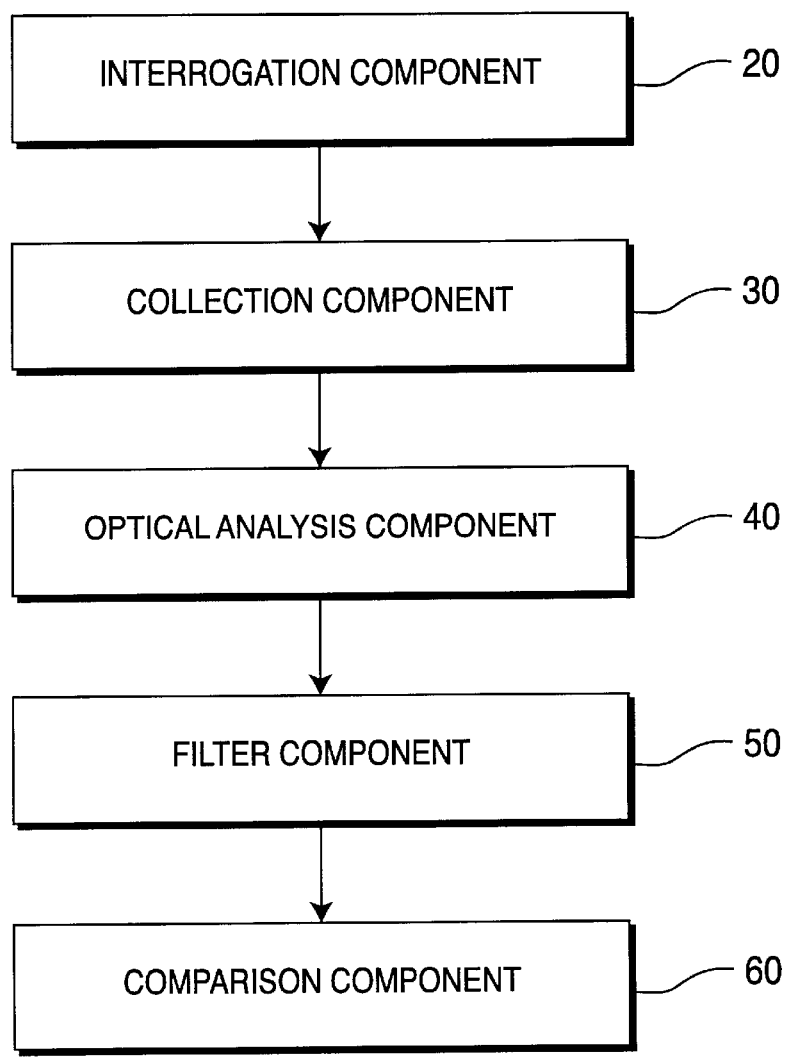
FIG. 1 is a schematic representation of the component parts of the present invention.

As seen in FIG. 1, an apparatus 10 for remotely sensing and identifying CBMs comprises an interrogation component 20, a collection component 30, an optical analysis component 40, a filter component 50, and a comparison component 60. The apparatus 10 uses an active remote sensing system comprising a photopolarimeter. The photopolarimeter comprises a standoff surface contamination detection sensor that identifies possible CBMs at a distance by interrogating suspect materials with infrared laser light from the interrogation component 20. The radiation produces backscattering from the CBMs, which are used to distinguish particular CBMs on a surface. Specific backscattered laser radiation information is collected from the CBMs by the collection component 30, which is electronically recorded and mathematically analyzed through the optical analysis component 40. The information is filtered using the filter component 50 that produces a Mueller matrix. Selective Mueller matrix elements are compared with known data using the comparison component 60 to identify known CBMs within a suspect material. Light from the last polarizer in the received backscattered beam is imaged onto a n×n array of light detectors so as to produce n squared scattergrams, one per pixel in the detector array. The scattergram is processed and transformed into 16 Mueller matrix elements, filtered and distributed to a neural network trained to pattern match each biological compound to the 16 or less calculated Mueller matrix elements. Characteristics such as particle size, particle shape, refractive index, and the like, are correlated. Simultaneously, the present invention ranges the distance to the CBMs to accurately locate the suspect materials.

The radiation source or sources of the photopolarimeter are tuned to one or several narrow vibration bands of the targeted CBMs, known from a catalog of infrared spectra. The photopolarimeter does not conduct a continual scan of the infrared region. Multiple polarization-modulated infrared laser beams of distinct energy levels are sequentially directed against CBMs within a sample. The CBMs may form part of or exist on, the coating or surface of a composition of interest. As such, a plurality of materials within a given CBM sample may be compared and identified.

Figure 2:
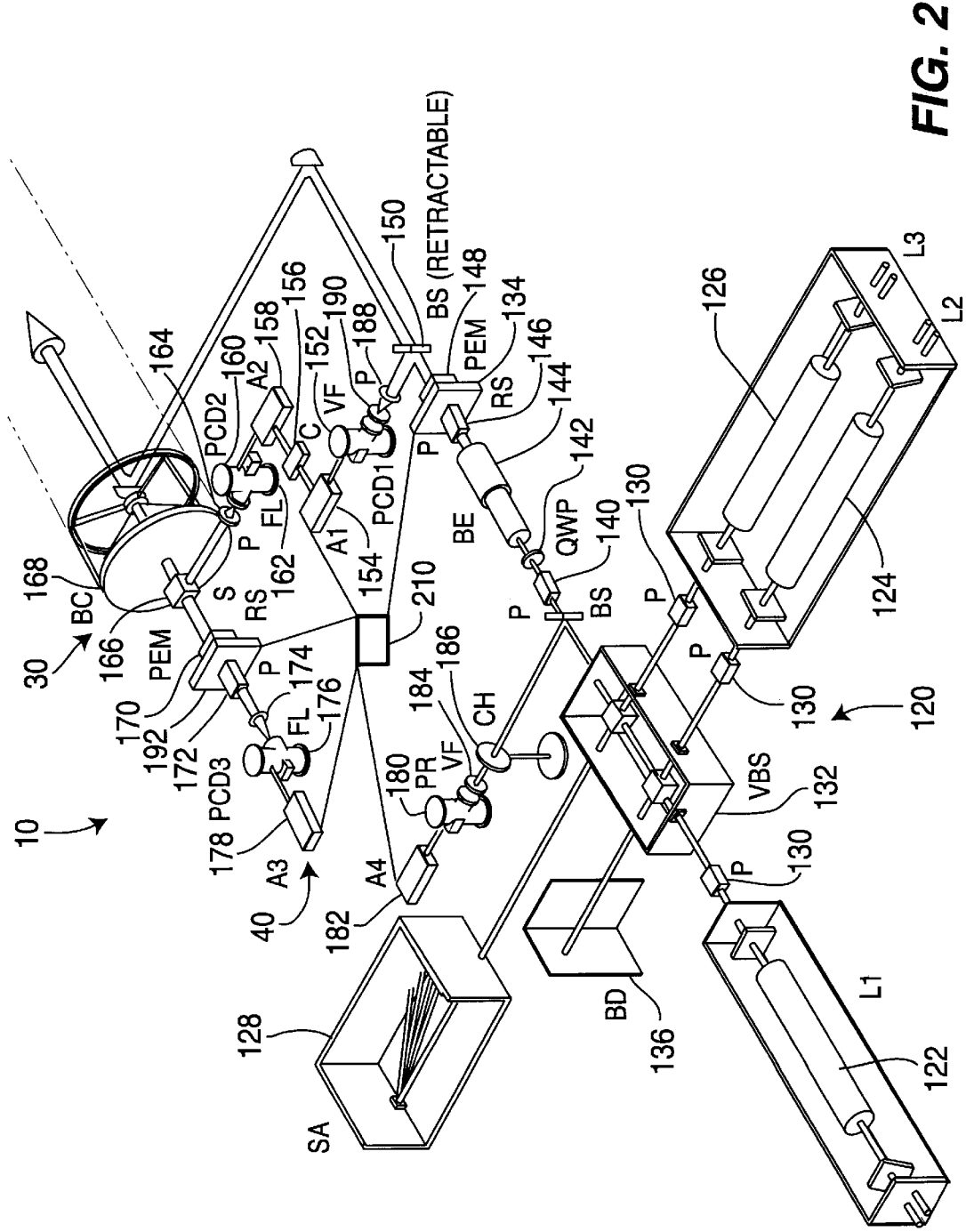
FIG. 2 is an optical layout of the Mueller matrix detection and ranging sensing system for the present invention.

As shown in FIG. 2, the interrogation component 20 of the apparatus 10 comprises a radiation source 120 of multiple grating tuned continuous-wave $CO_2$ lasers. The apparatus 10 remotely senses and identifies CBMs using the interrogation component 20 having at least two of the infrared radiation sources. The first infrared radiation source (L1) 122 is capable of irradiating CBMs at a predetermined exciting radiation to the vibrational bands of the type of CBMs being detected. As such, when the first infrared radiation source 122 radiates the CBMs, the CBMs become vibrationally excited. The second infrared radiation source (L2) 124 irradiates the CBMs at a predetermined referencing radiation to the vibrational bands of the irradiated CBMs and serves a reference energy role between resonant beam pulses. This referencing radiation does not vibrationally excite the CBMs. If desired, the apparatus 10 may comprise a third infrared radiation source (L3) 126 to vibrationally excite the CBMs in a second vibrational mode. All infrared radiation sources 122, 124, and 126 irradiate within the sensor's midinfrared radiation band of from about 9.10 μm to about 11.63 μm. Additionally, a fourth infrared radiation source may be used. Preferably, the lasers comprise continuous-wave (CW) infrared lasers that are pulsed by an electro-optic element (VBS) 132. CW infrared lasers provide a pure form beam source for light scattering and are more suitable than pulsed-laser sources because the beam duration can be controlled and adjusted to meet polarization modulation requirements. They provide accurate Mueller matrix measurements and high sensitivity while minimizing the occurrence of false detection events. Preferably the incident laser beams comprise from about two to about four beams, more preferably from about two to about three beams, and most preferably about three beams, with each of the beams emitting energy at a predetermined distinct energy level. Preferably, the laser tube of each laser is filled with regular or isotopic $CO_2$ gain media, such as $C^{12}O_2^{16}$, isotopic $C^{13}O_2^{16}$, $C^{14}O_2^{16}$, or $C^{13}O_2^{18}$ gas. Isotopic lasers provide a wider wavelength range and greater selection of energies to probe the scattering sample. Moreover, four-wavelength mixing matrix measurements are possible without a need for retuning and stabilization of the beams. Wider wavelength bands and greater energy selection are available from the vibration-rotation states of the more massive triatomic $C^*O^*_2$ isotope gas mixture. Their P-branch and R-branch transitions are shifted from the non-isotopic $CO_2$ excited states beyond broadening of spectroscopic lines. Additionally, blazed diffraction gratings comprise back resonators in each laser cavity, which facilitate making measurements of matrix elements at selective laser lines, with the lasers grating-tuned to the midinfrared P-branch and R-branch transitions of the gas. The output beam bandwidth of from about 9.10 μm to about 11.63 μm is within the infrared fingerprint region of most known chemical and biological warfare agents.

The lasers emit radiation through three separate Ge-stacked linear polarizers 130 with an extinction ratio of greater than 2000 to 1 (2000:1). Another stacked-plate Ge linear polarizer optic is mounted by precision rotary stage to each PEM (POL-PEM pair) and aligned precisely 45° between optic axes. The photopolarimeter has a POL-PEM optic pair in the transmitter beam and a PEM-POL pair in the receiver beam, where the POL here defines the incident and final Stokes vectors of the photopolarimeter, with the PEMs generating polarization modulation in incident and scattered laser light. Both transmitter and receiver PEM-POL pairs are positioned between scattering sample ψ and are responsible for generating the instrument scattergram output.

The radiation sources 122, 124, and 126 pass three incident beams to pulsing component 132 which switches these beams and directs the radiation into three paths, with a first part traveling to the scattering target via the photopolarimeter optics, a second part traveling to a beam dump (BD) 136; and a third part traveling to a spectrum analyzer (SA) 128. When exiting from the incident beam pulsing component (VBS) 132, the first part is further divided and sent at less than 0.1% reflectance to a power radiometer (PR) 180 with amplifier circuit (A4) 182 via a variable beam splitter (VF) 184 and chopper (CH) 186 and the other part, that contains most of all the beam energy, passes through a fourth Ge-stacked linear polarizer (P) 140, and then in and out of a quarter-wave plate (QWP) 142. After exiting the quarter-wave plate 142, the first part travels through an incident beam expander (BE) 144, a fifth Ge-stacked linear polarizer (P) 146, and through a first photoelastic modulator (PEM) 148. The rotary stage (RS) 134 rotates polarizer 146 and photoelastic modulator 148 in unison at fixed relative angle. The rotary stage 134 comprises servomotor control mechanism. The first part continues and is intermittently divided at the beam splitter (BS) 150, which separates the beam to 0.1% or less reflectance, with the splitting of beam performed only when the photopolarimeter is in a ranging mode of operation. A first section of the first part radiation passes to a first photoconductive HgCdTe detector and dewar (PCD1) 152 via linear polarizer (P) 188 and variable neutral density filter (VF) 190 with a second section of the first part radiation, the majority of the radiation, is reflected 90 degrees twice through a mirror system and sent to the scattering target. The first section exits the first photoconductive HgCdTe detector and dewar 152 and enters a first amplifier circuit (A1) 154. The amplifier circuit 154 records a sinusoidal function with frequency given by the driving frequency of PEM unit 148. On exiting the first amplifier circuit 154, the first section passes through a phase comparator electronics section (C) 156. The backscattered radiation is collected by a beam compression telescope (BC) 168 and reflected by the mirrored shutter (S) 166 when this shutter is closed. With shutter 166 closed, the backscattered radiation is passed to a second photoconductive HgCdTe detector and dewar (PCD2) 160, via a linear polarizer (P) 164 and first focusing lens (FL) 162. The signal generated by the second photoconductive HgCdTe detector and dewar 160 is amplified by amplifier circuit (A2) 158. The amplifier circuit 158 records a sinusoidal function with frequency given by the driving frequency of PEM unit 148 recorded at amplifier 154. The comparator circuit 156 measures the difference in phase between the sinusoids recorded at amplifiers 154 and 158. This phase difference is proportional to distance of the backscattering target. When shutter 166 is open, the backscattered radiation from beam condenser 168 is sent to a second photoelastic modulator (PEM) 170, a sixth Ge-stacked linear polarizers (P) 172, a second focusing lens (FL) 174, a third photoconductive HgCdTe detector and dewar (PCD3) 176, and a third amplifier (A3) 178. This third amplifier 178 records the scattergram, which is a complex waveform containing all primary and overtone frequencies of PEM modulators 148 and 170. The Mueller matrix elements are extracted digitally from the scattergram waveform produced at the third amplifier 178, or by analog phase-sensitive electronics.

Figure 3:
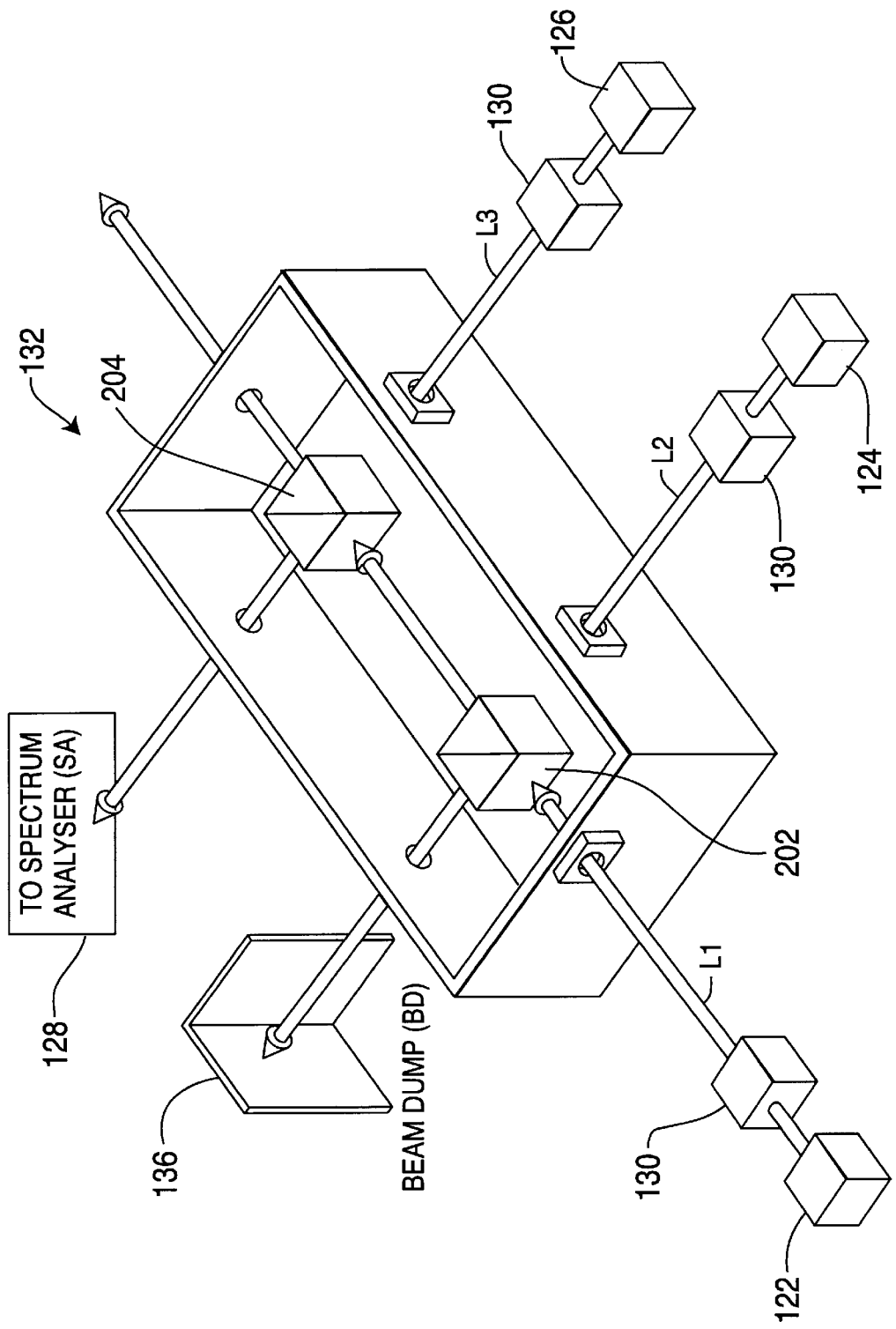
FIG. 3 is an incident beam pulsing component of the Mueller matrix sensor shown in FIG. 2.

FIG. 3 is an incident beam pulsing component of the Mueller matrix sensor shown in FIG. 2 with two variable beam splitters. The radiation from the three grating tuned continuous-wave $CO_2$ lasers, first laser 122, second laser 124 and third laser 126 enter the incident beam pulsing component 132 comprising variable beam-splitters 202 and 204. After passing through the Ge-stacked linear polarizers 130, the laser radiations are divided in the incident beam pulsing component 132 with the variable beam splitters 202 and 204. The laser radiations are pulsed and divided into three parts, with the first part traveling to interrogate a CBM sample, the second part traveling to the beam dump 136, and the third part traveling to the spectrum analyzer 128. Variable beam splitters 202 and 204 are diagonally segmented ZnSe cubes that transmit the incident $CO_2$ beams at a diagonal interface when mated. The variable beam splitters 202 and 204 reflect the incident $CO_2$ beams at a diagonal interface when detached. Piezoceramic actuators with driver circuits control beam modulation.

The apparatus 10 comprises two PEMs 148 and 170. The photopolarimeter remote sensor generates polarization modulation in incident and backscattered beams for simultaneously phase-locking 8 of 16 Mueller matrix elements from the scattergram output. Four sequential permutations of two mated polarizer-PEM optic pairs, along the optical transmission and receiver axes of the sensor are required for making a full 16-element matrix measurement. However, a complete matrix field is not required for establishing CBM detection events, as the feature backscattering elements that meet statistical imposed constraints for all of the tested compounds comprises subsets of the fill Mueller matrix field. With two photoelastic modulators 148 and 170 in the photopolarimeter design, instead of three or four PEMs, a required number of four or less susceptive differential Mueller matrix elements, per beams tuned on-then-off resonance scattering, are necessary to determine a detection event of the CBMs within the sensitivity limitations of the instrument. The two PEM photopolarimeter design provides advantages of greater separation in frequency components giving greater spread in the Fourier components of the scattergram when the driving frequencies of the two PEMs 148 and 170 are correctly chosen. As such, the electronic bandwidth restrictions on the sensor's lock-in amplifier electronics are relaxed and matrix element mixing by higher harmonics that are close to overlapping in the scattergram are reduced.

The two-photoelastic modulators 148 and 170 comprise ZnSe crystals. The PEMs 148 and 170 produce oscillating birefringence in the ZnSe crystals. An oscillating birefringence along the PEM extraordinary. (fast) optical axis is driven by piezoelectric quartz transducers bonded to opposite ends of the ZnSe crystal cleaved to certain geometric specifications. The two crystals compress then relax within the sensor at natural mechanical resonance frequencies, with $\omega_{(incident)}$=33.980 kHz and $\omega_{(backscattering)}$=31.896 kHz. The greater an applied strain along the ZnSe fast axial plane, within elastic limits of the ZnSe crystal, the greater a change in the refractive index experienced by the electromagnetic field (EMF) component of the laser beam along that axis. The beam orthogonal EMF component in the plane of the ordinary (slow) axis of the ZnSe crystal, an equal intensity component, propagates through the crystal with constant refractive index. A time-varying lag in phase from slow to fast field components (the variance of the refractive index between components is birefringence) is called retardation. Within the sensor, the maximum amplitude of retardation is set to and maintained at $\omega_0$=2.303 radians during beam switching operations. This simplifies the functional form of the scattergram and is performed by external circuitry connected to the PEM control units. The PEMs generate a type of encoding for a CBM Mueller matrix by rapid polarization modulation in incident and backscattered laser beams at rates of from about 30 kHz to about 40 kHz. The PEM optics with control electronics may be obtained from Hinds Instruments, Inc. of Hillsboro, Oreg.

The collection component 30, comprising the beam compression telescope 168 and other component parts, collects backscattering radiation from the CBMs when the materials are irradiated with either the exciting radiation beam or referencing radiation beam. This scattergram is a temporal voltage waveform $I_f$, containing physical and geometric information completely describing the CBM in elastic scattering. A scattergram is derived from the sensor's fixed incident and final Stokes vectors, comprising a 4×1 matrix that fully describes the Polarization States of the incident and backscattered beams. The transformation between Strokes vectors defines the system Mueller matrix. This may be defined as:

$$\psi' = P_r G_r \psi G_t P_t; \quad (1)$$

where subscripts t and r represent transmitter and receiver, P and G are the Mueller matrices of polarizer and modulation optics, also known as POL and PEM, respectively, $\psi$ is the unknown scattering sample Mueller matrix, and $\psi'$ is the sensor system product matrix. The Mueller matrix $\psi$ of the sample is extracted directly from the system matrix $\psi'$ since P and G are known. The laboratory photopolarimeter system has additional flat steering mirrors between modulators whose matrices are also included in the $\psi'$. These optically identical mirrors, however, reflect light twice by 90° cause a mutual cancellation in phase shifts and equalization of amplitude attenuation upon mirror reflections only, and provide a product matrix of an identity matrix. Therefore, these flat steering mirrors have no effect on Mueller matrix measurements by the backscattering sample.

The matrix $\psi'$ transforms the Stokes vector of the incident beam, preset by optic $P_t$, into a final backscattered radiant beam Stokes vector, preset by optic $P_r$:

$$s^r = \psi' s^t. \quad (2)$$

The photopolarimeter can be adjusted to four distinct linear states of polarization in incident transmitted ($s^t$) and backscattered received ($s^r$) beams comprising: (Case 1) Vertical −45°|+45° Vertical; (Case 2) Vertical −45°|+45° Vertical; (Case 3) Vertical +45°|−45° Vertical; (Case 4) Vertical +45°|+45° Vertical. Entries on the left of the vertical bar represent axial orientations of POL-PEM optics in the incident beam, and entries on the right of the vertical bar represent axial orientations of PEM-POL optics in the back-scattered beam (see Table 1(a)). Permutations between the optical states are done by precise stepper-motor rotary action.

Matrix elements of $\psi'$, and the known Stokes vectors $s^t$ and $s^r$ may be used for solving the temporal Mercury-Cadmium-Telluride (MCT) detector intensity $I_f(t)$, deriving a functional form for the scattergram that is produced at amplifier 178. The $I_f$ functional form is an infinite series expansion in primary and overtone frequencies of the PEM oscillators (T):

$$I_f = \psi_{11} + I(j\omega_1, k\omega_2, j\omega_1 \pm k\omega_2), \quad (3)$$

where $\psi_{11}$ is an intensity (dc) element of the Mueller matrix that has no polarization dependence, and I is the scattergram's Fourier expansion. The amplitude of each frequency component in I is given by the product of one or two Bessel functions of integer order n that tend rapidly to zero as n increases and a factor that is one of eight Mueller matrix elements. The intensity component $\psi_{11}$ is always present in the MCT output as an offset voltage for all Cases 1–4, previously identified.

The PEM frequencies track elements of $\psi$ as shown in Table 1. Table 1(a) provides optical orientations of linear polarizer and photoelastic modulator optical axes. Table 1(b) provides lock-in frequencies of transmitter ($\omega_1$) and receiver ($\omega_2$) photoelastic modular optical axes that map onto their respective Mueller elements $\psi_{ij}$ from the scattegram's Fourier intensities. The parenthetical numbers refer to relative intensity of the Fourier components. The known Mueller elements of the calibrator are matched to the instrument's data outputs by independent phase and amplitude adjustments in each PSD board.

TABLE 1(a)

| | TRANSMITTER | | RECEIVER | |
|---|---|---|---|---|
| | Linear Polarizer | Photoelastic Modulator | Photoelastic Modulator | Linear Polarizer |
| (Case 1) | Vertical | −45° | +45° | Vertical |
| (Case 2) | Vertical | −45° | Vertical | −45° |
| (Case 3) | +45° | Vertical | Vertical | −45° |
| (Case 4) | +45° | Vertical | +45° | Vertical |

TABLE 1(b)

| $\psi_{11}$ | $\psi_{12}$ | $\psi_{13}$ | $\psi_{14}$ |
|---|---|---|---|
| dc | $2\omega_1(0.431)$ | 0 | $\omega_1(0.520)$ |
| dc | $2\omega_1(0.431)$ | 0 | $\omega_1(0.520)$ |
| dc | 0 | $2\omega_1(0.431)$ | $\omega_1(0.520)$ |
| dc | 0 | $2\omega_1(0.431)$ | $\omega_1(0.520)$ |

| $\psi_{21}$ | $\psi_{22}$ | $\psi_{23}$ | $\psi_{24}$ |
|---|---|---|---|
| $2\omega_2(0.431)$ | $2\omega_2 - 2\omega_1(0.186)$ | 0 | $\omega_1 + 2\omega_2(0.224)$ |
| 0 | 0 | 0 | 0 |
| 0 | 0 | 0 | 0 |
| $2\omega_2(0.431)$ | 0 | $2\omega_2 - 2\omega_1(0.186)$ | $\omega_1 + 2\omega_2(0.224)$ |

| $\psi_{31}$ | $\psi_{32}$ | $\psi_{33}$ | $\psi_{34}$ |
|---|---|---|---|
| 0 | 0 | 0 | 0 |
| $2\omega_2(0.431)$ | $2\omega_2 - 2\omega_1(0.186)$ | 0 | $\omega_1 + 2\omega_2(0.224)$ |
| $2\omega_2(0.431)$ | 0 | $2\omega_2 - 2\omega_1(0.186)$ | $\omega_1 + 2\omega_2(0.224)$ |
| 0 | 0 | 0 | 0 |

| $\psi_{41}$ | $\psi_{42}$ | $\psi_{43}$ | $\psi_{44}$ |
|---|---|---|---|
| $\omega_2(0.520)$ | $2\omega_1 + \omega_2(0.224)$ | 0 | $\omega_1 + \omega_2(0.270)$ |
| $\omega_2(0.520)$ | $2\omega_1 + \omega_2(0.224)$ | 0 | $\omega_1 + \omega_2(0.270)$ |
| $\omega_2(0.520)$ | 0 | $2\omega_1 + \omega_2(0.224)$ | $\omega_1 + \omega_2(0.270)$ |
| $\omega_2(0.520)$ | 0 | $2\omega_1 + \omega_2(0.224)$ | $\omega_1 + \omega_2(0.270)$ |

The lock-in frequencies were chosen at an order of less than or equal to 2, corresponding to the dominant spectral intensities of the scattergram waveform. Higher order Bessel function coefficients reduce the intensity of the higher overtones in I below MCT detector signal-to-noise levels acceptable for CBM detection.

The scattergram output of the photopolarimeter can be represented as the sum of an infinite number of discrete frequencies, namely the sums and differences of all integral multiples of the two PEM frequencies, from equation 3 above. Determination of the Mueller elements, then, is equivalent to the measurement of amplitude of the corresponding frequency component, which is done in the laboratory photopolarimeter with 8 separate lock-in amplifiers, one for each frequency component of Table 1(b). There are eight sinusoidal reference signals conducted to the amplifiers by analog multiplication and filtering of the oscillators driving each PEM crystal. The scattergram waveform is split, passed through a narrow bandpass filter, and sent to all 8 lock-in channels. The inner product of scattergram and reference sinusoid waveforms produce a scalar output by the lock-in amplifier that is a measure of amplitude of the reference frequency component in the scattergram. This also provides a measure of the Mueller matrix element that corresponds to that frequency component. The lock-in amplifiers have a response time within a few tenths of a second, depending on the amount of MCT detector noise present. This provides real-time detection and identification of the CBMs.

The optical analysis component 40, comprising the third amplifier 178 and other component parts, is capable of converting the collected backscattered radiation into Mueller matrix elements. The scattergram is measured by a cooled photoconductive HgCdTe (MCT) chip located beyond the receiver POL optic of the photopolarimeter at the focus of the positive ZnSe lens. The Mueller matrix elements are measured in the direction of beam backscattering at $CO_2$ laser energies that activate/deactivate the molecular vibration mode in the targeted CBM. When one or several differential-absorption Mueller elements are traced to the scattering target on a consistent basis, with sufficient signal-to-noise ratio, then the empirical data is treated as features for pattern recognition of the contaminant for which the laser energies were set. Preferably, this is done through training and validating a sensor front-end neural network signal processor. As the radiation is tuned to an absorption line in the CBMs or analyte, molecular subgroups in the irradiated organic are stimulated into vibration states. The full polarization response is measured using the Mueller matrix in the backscattered beam during the vibrational stimulation. An abrupt change of signal in the matrix elements on and off the absorption bandheads that are anti-correlated and statistically disjoint encompass the susceptive Mueller subfield and are the feature detection data determinative of CBM identification, with the Mueller matrix spectrometer element outputs transformed into feature space. Feature space provides a partitioned domain where susceptive difference elements that obey a few statistical rules are filtered and cast into multi-dimensional data structures. Unlike previous methods, the present invention provides a one-to-one mapping from a field of susceptive difference elements onto the CBM target, causing abrupt changes in some of the elements under the resonance-to-resonance backscattering conditions. By placing raw element outputs by the Mueller matrix spectrometer transformed into feature space, the structures possess the appropriate format for neural network modeling, training, and testing. The feature space possesses only specified susceptive, difference Mueller matrix elements, which are normalized into their dc or intensity [1,1] elements. Identification of the CBMs comprises less than all 16 Mueller matrix elements, preferably using from about 15 or less normalized elements, more preferably from about 8 or less normalized elements, and most preferably from about 4 or less normalized elements.

Signal processing uses separate lock-in amplifiers for determining the normalized Mueller matrix elements at a given wavelength and scattering angle. The driving amplitudes on the two photoelastic modulators 148 and 170 are properly set for the wavelength in use, and the angles and orientations of all the optical elements are correctly adjusted. Each PEM controller supplies two square reference frequencies synchronized with its photoelastic modulator, one at the driving frequency and the other at twice the driving frequency. Analog multipliers and filters, made with IC circuits, are then used to generate the remaining sum and difference reference frequencies. For example, to generate the $(2\omega_2+\omega_1)$ signal, the $2\omega_2$ and the $\omega_1$ signals ($\cos 2\omega_2 t$ and $\cos\omega_1 t$) to the inputs of the multiplier, which results in an output of $\frac{1}{2}\{\cos(2\omega_2-\omega_1)t+\cos(2\omega_2+\omega_1)t\}$. A high-Q filter transmits the desired component while suppressing the other.

As indicated by equation 3, the output of the HgCdTe detector is a time varying voltage, or scattergram, represented in frequency space by a dc component and an infinite number of discrete frequencies. The dc level is proportional to the [1,1] matrix element and is held constant through a servo gain control, effectively normalizing the other matrix elements. The eight discrete frequencies of interest, each proportional to one of eight matrix elements, are picked out of the scattergram by eight lock-in amplifiers. A lock-in amplifier's two inputs are the ac detector signal and one of the reference signals. In effect, the two inputs are multiplied together, giving the dc level of its output proportional to the amplitude of the detector signal at the reference frequency, times a phase factor.

Phase shifters and gain controls are added to each lock-in and adjusted during calibration steps until at each channel the output range of $-1.0$ volt to $+1.0$ volt maps to the normalized Mueller matrix values $-1$ to $+1$. However, acquiring Mueller matrix elements by calculating them from the scattergram, rather than manipulating the scattergram with analog electronics, is preferred. By digitizing the detector output voltage and at least the PEM controller reference frequency voltages, one may calculate the Mueller matrix elements from the scattergram. A/D boards with 12 and 16 bits resolution, 1 MHz sampling rate, with 4 or more channels of simultaneous sampling are readily available. Digitizing persists until there is sufficient data for calculating the matrix elements. This may be done as a fast Fourier transform (FFT) on a data stream sampled from the detector and note the amplitudes at the eight frequencies of interest. A calibration relating each Fourier amplitude to the corresponding normalized Mueller matrix amplitude is then performed. However, in principle, a simple power spectrum of the detector output will yield the magnitudes of the Mueller matrix elements. The FFT must compute the phase of each signal component as well as its amplitude, and the complex FFT must also be performed on simultaneously sampled sine waves synchronized with the two-photoelastic modulators. From the three phases and using a phase correction determined in the calibration procedure, the sign of the Mueller matrix element may be calculated. Additionally, a computer 210 may be programmed to carry out numerically the same multiplication and filtering that the analog electronics perform. As such, synchronization of a pair of reference sawtooth waveform, rather than sine waves with photoelastic modulators may be preferred. The simultaneous phases of the remaining six reference frequencies may be quickly calculated from sums and differences of the two sampled phases. The multiplication of the detected signal by the reference signals would be carried out numerically, as would the dc filtering for averaging, which results in the matrix element values.

The computer 210 may control several aspects of the present invention, including the rotary stage 134 and 192, the third amplifier 178 and the beam pulsing component 132. Additionally, the computer performs the functions of filter component 50, and comparison component 60. The filter component 50 of the present invention is capable of filtering pattern recognition from the Mueller matrix for specific predetermined materials. Final training of a dimensional vector, where k is less than or equal to 15, produces an optimized weight matrix. The weight matrix provides the CBM filter and performs pattern recognition in pre-processed network feed-forward sensor data.

The comparison component 60 of the present invention is capable of receiving the pattern recognition from the filter component and determining the presence of specific predetermined materials. This provides a detection decision that is made after a difference-energy Mueller matrix spectrum presented at the fully trained network input layer is forwarded through the weight matrix producing a vector at its output layer that matches the CBM difference-energy Mueller matrix spectrum training vector. Post-processing of an $n^{th}$ dimensional vector presented at the output layer, where n is the number of CBM training data sets, confirms the presence or non-presence of any-of-n CBM target compounds or analytes. The period of detection is of the order of milliseconds if the weight matrix is implemented in analog integrated circuit (IC) chips.

The infrared detection and ranging apparatus and method of the present invention require only that a one-to-one mapping exist from a field of susceptive difference element or elements onto the CBM target. This includes, but is not limited to, abrupt changes in some of the elements under the resonance-to-nonresonance backscattering conditions. If and only if one or several differential-absorption Mueller elements are consistently traceable to scattering of a target CBM, then these empirical data are valid as features for pattern recognition of the contaminate target CBM. The differential-absorption Mueller elements must have sufficient signal-to-noise ratio. Background matter is distinguished from the CBM by analysis of collected data snapshots from the laser radiation, providing infrared Mueller matrices from the backscattering of the multiple pulsating incident laser beams.

The method further comprises the step of determining the distance to the scattering target by comparing modulation between the first infrared radiation source and the backscattered radiance. Detection and identification of the CBMs occurs at distances that permit safe classification of the CBMs. Preferably the detection and identification distances are from about one-half mile or greater, more preferably from about one mile to about 20 miles, still more preferably from about one mile to about twelve miles, and most preferably from about one mile to about six miles.

The present invention further comprises a method for identifying CBMs that comprises providing the apparatus 10, irradiating a surface possibly containing the materials with the first and second radiation sources, collecting backscattered radiation from the irradiated surface, converting the backscattered radiation into Mueller matrix elements, recognizing patterns within the Mueller matrix for specific predetermined materials, and, mathematically determining the presence of the specific predetermined materials from the pattern recognition. The method further comprises the step of irradiating the surface with a second exciting radiation, which vibrationally excites the CBMs.

In operation; alignment, calibration and system automation was performed on the system. The angle between linear polarizer and ZnSe extraordinary axes in each POL-PEM pair was set precisely to 45°, equalizing orthogonal EMF components of the beam along fast and slow ZnSe axes. Separate alignment was accomplished by the following procedure:

One transmitter laser beam was made to pass through the optical configuration, P(G:P)Q, where the first optic Q was a quarter-wave plate which converts the incident linearly-polarized beam into a circular-polarized state; G:P was the POL-PEM pair mounted via a precision rotary stage with the axes to be aligned; and P was another linear Ge linear polarizer, which needed to produce a sinusoidal voltage output in a MCT detector located beyond the optic. The MCT voltage output was electronically amplified and passed to the input of a lock-in amplifier (LIA) whose reference input was conducted directly from the PEM controller unit. A micrometer on the G:P rotary stage mount was rotated until a null signal was read on the LIA. Rotation was done at high LIA gain, thereby assuring the POL-PEM axes were accurately co-aligned. A micrometer was then turned to rotate the mount stage precisely 45°. A setscrew was then tightened to permanently lock the POL-PEM optics into position.

With the two POL-PEM pairs properly aligned at 45°, the photopolarimeter was calibrated by replacing the unknown scattering matrix ψ of Equation 1 with the known optics: a polarizer (P), a quarter-wave plate (Q), or an ordered combination of (QP or PQ). Table 2 outlines the calibration procedure, where the left two columns list the data system's channel number and its associated primary or overtone scattergram frequency component of Table 1(b). While uniformly rotating the calibrator optic(s), the amplitude and phase of each phase-sensitive detector board (or channel) was made to match the known output signal by the calibrator optic.

Figure 4:
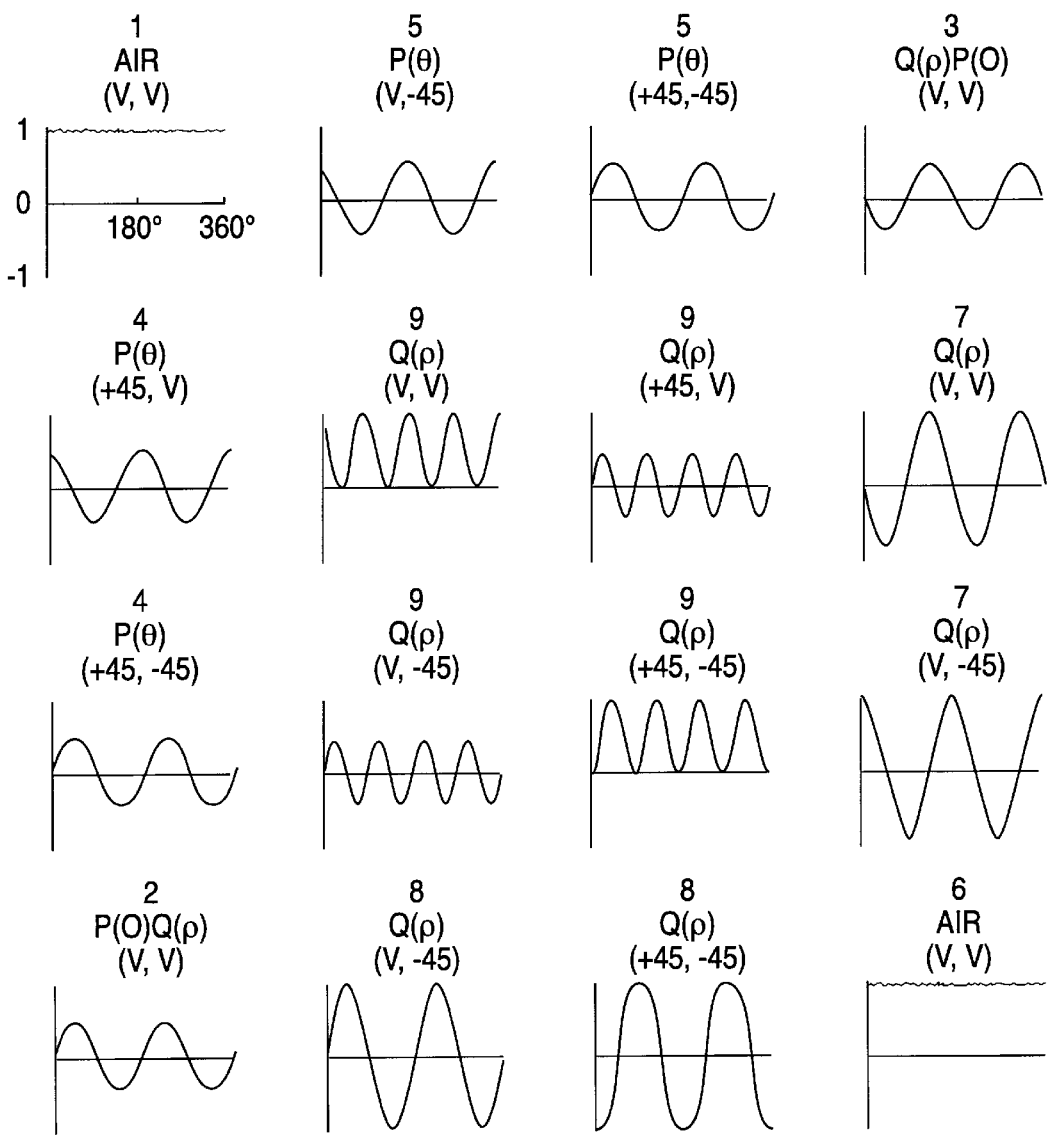
FIG. 4 are graphical representations of calibration data of a two-modulator infrared Mueller matrix spectrometer system.

Table 2 is a calibration of the Mueller matrix sensor's analog phase-sensitive detection channels, with the measured data plotted in FIG. 4. The photoelastic modulator frequencies in incident and scattered laser beams are $\omega_1$ and $\omega_2$, respectively. The rotating quarter-wave plate is ed Q(ρ), the rotating linear polarizer P(θ), and the fixed linear vertical polarizer P(0).

TABLE 2

| | | Incident Strokes Vector, Final Strokes Vector (POL optic orientations) | | | |
| | Lock-in | [Optic Calibrator, Mueller Element, signal waveform] | | | |
| CH | Frequency | V, V | V, −45° | +45°, −45° | +45°, V |
|---|---|---|---|---|---|
| 1 | dc | Air, 11, unity | — | — | — |
| 2 | $\omega_2$ | P(0)Q(ρ), 41, ½sin2ρ | — | — | — |
| 3 | $\omega_1$ | Q(ρ)P(0), 14, −½sin2ρ | — | — | — |
| 4 | $2\omega_2$ | — | — | P(θ), 31, ½sin2θ | P(θ), 21, ½cos2θ |
| 5 | $2\omega_1$ | — | P(θ), 12, 1/2cos2θ | P(θ), 13, ½sin2θ | — |
| 6 | $\omega_1 + \omega_2$ | Air, 44, unity | — | — | — |
| 7 | $2\omega_2 + \omega_1$ | Q(ρ), 24, −sin2ρ | Q(ρ), 34, cos2ρ | — | — |
| 8 | $2\omega_1 + \omega_2$ | — | Q(ρ), 42, sin2ρ | Q(ρ), 43, −cos2ρ | — |
| 9 | $2\omega_1 + 2\omega_2$ | Q(ρ), 22, cos²2ρ | Q(ρ), 32, (cos2ρ)(sin2ρ) | Q(ρ), 33, sin²ρ | Q(ρ), 23, (cos2ρ)(sin2ρ) |

For example, in column 3 of Table 2, 6 of 16 Mueller elements are available for calibration given the optical configuration Case 1 (Table 1a). In channel 2 of column 3, the calibrator was a rotating quarter-wave plate Q(ρ) followed by a linear polarizer with fixed vertical axis P(0):P(0)Q(ρ). The [4,1] Mueller element was under calibration, and channel 2 required adjustment so as to match the known output waveform ½(sin2ρ) of the rotating quarter-wave plate Q(ρ). FIG. 4 comprises a digitized reproduction of data by a calibration run using this method. FIG. 4 shows amplitude verses angle of the respective optic calibrator when proper adjustments were made to the phase-sensitive detection boards of the data acquisition system. In FIG. 4, each graph lists the data system's channel number, the optic(s) used to calibrate that channel, and the optical configuration of the photopolarimeter for Cases 1–4.

FIG. 4 shows the calibration data of a two-modulator infrared Mueller matrix spectrometer system from voltage outputs from a bank of eight phase-sensitive detection (PSD) circuits as a function of rotation angle (ρ or θ) of the calibration optic (P, linear polarizer or Q, quarter-wave plate). The graphical representations are designated with the channel designate of the instrument's analog PSD electronics array, shown as the top entry, the optic(s) calibrator as the middle entry and the optical configuration of the linear polarizers that define the spectrometer's incident and final Stokes vectors, shown as the bottom entry. The optical configuration of linear polarizers defining the spectrometer's incident and final Stokes vectors as listed in Table 1(a).

Figure 5:
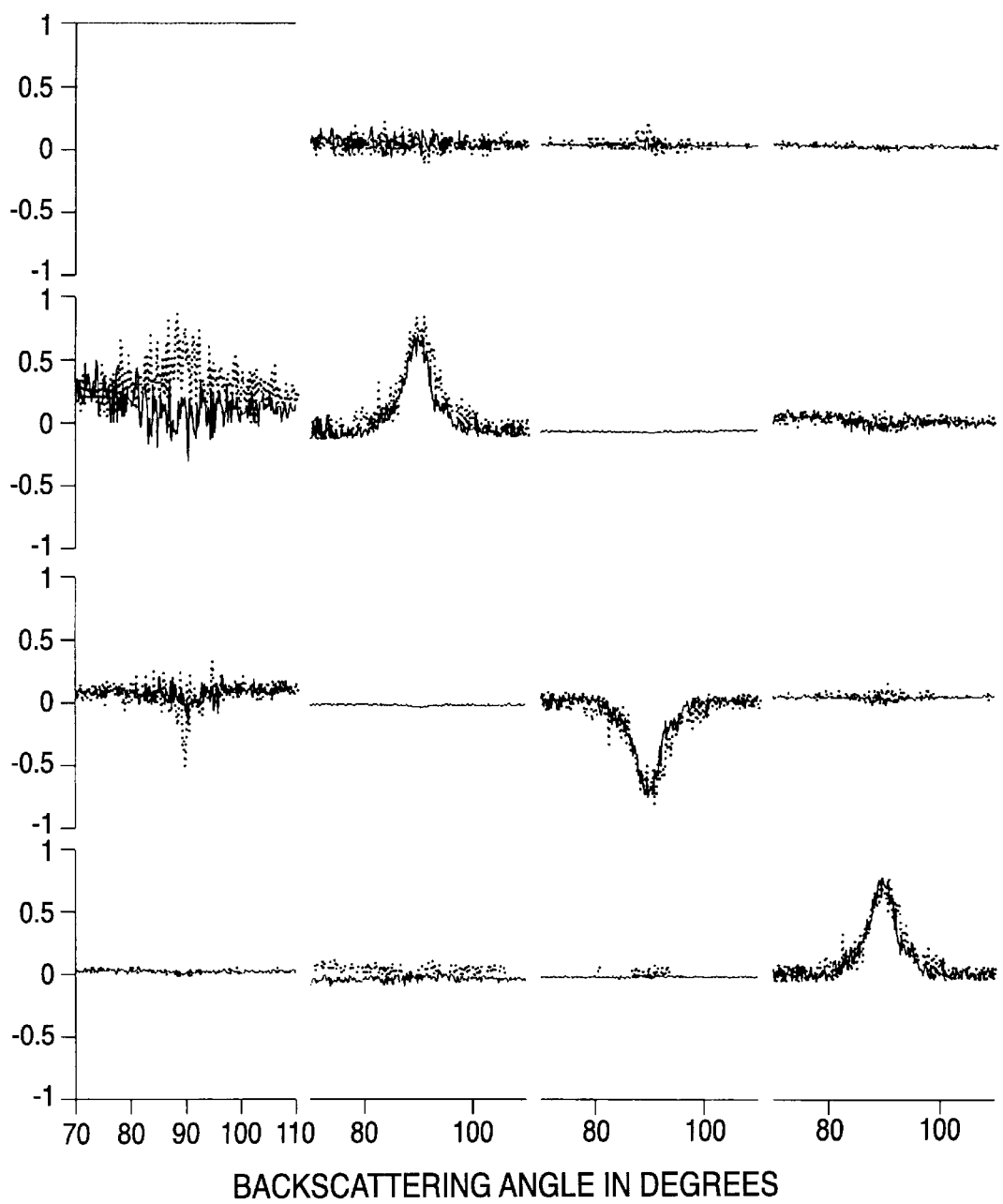
FIG. 5 is a graphical representation of the raw experimental data of the normalized Mueller matrix elements as a function of backscattering angle for the organic compound L-tartaric acid off and on vibration resonance.

In FIG. 5, all 16 matrix elements of an inch thick wafer of L-tartaric acid (dextrorotatory having a levo molecular configuration) are plotted as a function of backscattering angle, where 90° is normal beam incidence, the angular spread is $70° \leq \theta_B \leq 110°$, and resolution of angle is 0.01°. The data in FIG. 5 presents raw data outputs by the instrument's 9-channel acquisition system at beam resonance energy 1082.3 $cm^{-1}$, shown as the dotted line, and off-resonance energy of 1029.9 $cm^{-1}$, shown as a solid line in the fruit acid.

Applying statistical analysis enhanced the difference between the resonance energy and off-resonance energy data. First, a program was written to compute the mean ($<\psi>$), standard deviation (SD), and correlation coefficient of each $\psi_{ij}(\theta_B)$ scan between resonance and nonresonance wavelengths. From this data, only elements that were anti-correlated between energies were selected. This provided elements, during alternating beam pulses, displaying oscillating amplitudes of opposite sign. Additionally, only those difference elements that were statistically disjoint, such as $\psi^{on}_{ij}(90°)$ and $\psi^{off}_{ij}(90°)$ that were separable by at least one standard deviation (SD) were chosen. Furthermore, the susceptive difference elements were auto-scaled so that data having different dynamic ranges would be compared directly. Auto-scaling was computed as:

$$\Delta\psi^{scale}_{ij}(90°)=(\Delta\psi_{ij}(90°)-<\Delta\psi_{ij}(90°)>)/SD.$$

Figure 6:
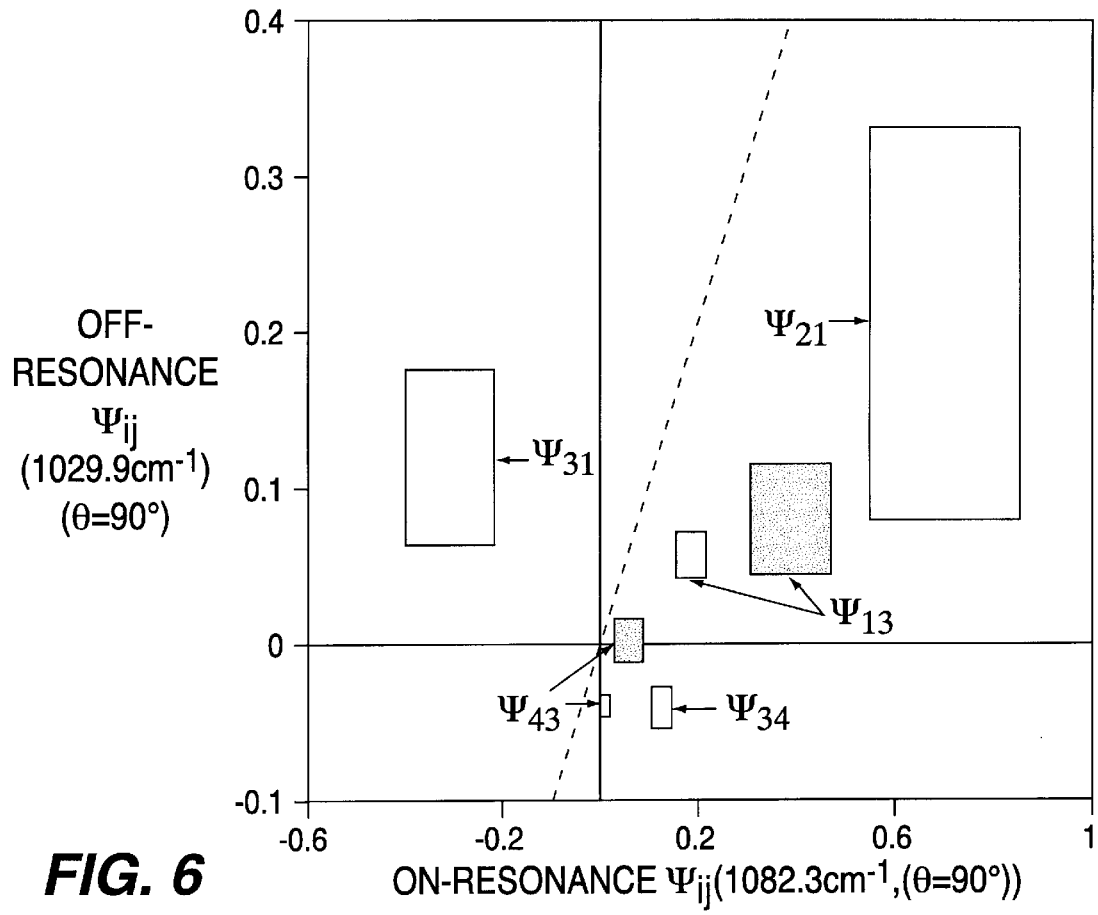
FIG. 6 shows statistically disjointed and anti-correlated Mueller matrix elements on and off vibration resonance beam backscattering ($\psi$)

FIG. 5 shows raw experimental data of the normalized Mueller matrix elements as a function of backscattering angle for the organic compound L-tartaric acid off and on vibration resonance. The solid line at 1029.9 $cm^{-1}$ represents the off vibration resonance and the dotted line at 1082.3 $cm^{-1}$ represents the on-vibration resonance. A 90° backscattering angle is normal beam incidence. Filtered and scaled difference elements [1,3], [2,1], [3,1], [3,4] and [4,3] are featured for the standoff detection of L-tartaric acid, shown in FIG. 6. The susceptive elements of the isomer L-tartaric acid, in open rectangles and D-tartaric acid in solid rectangles were sketched at the reference and probe beam energies. Susceptive elements are those elements of the Mueller matrix that have negative or anti-correlation of elements rule between probe and reference beam energies and that the separation of amplitude between the elements is at least one standard deviation apart, providing disjointness of elements rule. The element domains furthest from the dashed diagonal line in FIG. 6 provided the most significant features for detection of each of the stereoisomers. As shown in FIG. 6, the present invention provided the element domains $\psi_{1,3}(90°)$ and $\psi_{4,3}(90°)$ of each stereoisomer as distinct entities, enabling the natural levorotary form of tartaric acid to be distinguished from its synthesized unnatural dextrorotary form by differential absorption Mueller matrix spectroscopy. The Mueller matrix measurements of several crystalline organic materials, with statistics, are listed in Table 3. Dash entries in Table 3 signify that one or both statistical criteria for the selection of a feature Mueller element were not met.

FIG. 6 shows statistically disjointed and anti-correlated Mueller matrix elements on and off vibration resonance beam backscattering ($\psi$). The element features for L-tartaric acid are shown as open rectangles and element features for D-tartaric acid are shown as shaded rectangles. The rectangle dimensions are standard deviations of experimental measurements derived from FIG. 5 and Table 3. For remote detection purposes, the rectangular bi-variant polarized light signature domains cannot intercept the dashed diagonal line.

Table 3 lists the measured polarization signatures of selected organic compound wafers, i.e., backscattering infrared Mueller matrix elements ($\psi,\psi'$) that are anti-correlated and statistically disjoint on-then-off beam resonance energies. Pattern recognition and detection of the organic compounds are featured in the scaled difference ($\Delta\psi_{(mean)}$) and negative correlation coefficients of elements data. Table 3 lists the compound, the Mueller element (i,j), the off-resonance beam energy, (off-beam) in units of $\nu$ in $cm^{-1}$, the normalize off-resonance beam energy ($\psi_{ij}$) as $\nu$, $\theta=90°$, one standard deviation (SD), the on-resonance beam energy (on-beam) in units of $\nu$ in $cm^{-1}$, the normalized on-resonance beam energy ($\psi'_{ij}$) as $\nu$, $\theta=90°$, one SD, scaled percentage difference ($\Delta\psi_{(mean)}$) as $\nu$, $\theta=90°$, one SD, and correlation of elements on/off resonance (on/off) having backscattering angle spread of 40° about normal incidence.

The compounds listed in Table 3 include DL-alanine (racemic amino acid; $CH_3CH(NH_2)COOH$), L-alanine (amino acid; $CH_3CH(NH_2)COOH$), DL-aspartic(amino) acid ($HOOCH_2CH(NH_2)COOH$), (1R)-(+)-camphor (1,7,7-Trimethyl-[2.2.1]heptan-2-one), (1S)-(−)-camphor ($C_{10}H_{12}O$), D-fructose (fruit sugar, $C_6H_{12}O_6$), D-glucose (blood sugar, $C6H_{12}O_6$), L-histidine (amino acid, glyoxaline-5-alanine), D-mannose (α-form sugar, $C_6H_{12}O_6$), L-serine (amino acid, $HOCH_2CH(NH_2)COOH$), L-sorbose (open ring sugar, $C_6H_{12}O_6$), DL-tartaric acid (racemic acid, 2-dihydroxy-butanedioic acid), L-tartaric acid (fruit acid, [R-(R*,R*)]-2,3-dihydroxy-butanedioic acid), D-tartaric acid (levorotatory/dextro configuration, [S-(R*,R*)]-2,3-dihydroxy-butanedioic aicd), L-tryptophan (amino acid, 2-amino-3-propionic acid), and L-tyrosine (amino acid, β-(p-hydroxy-phenyl) alanine.

TABLE 3

| Compound | i,j | off-beam | ψi,j | on-beam | ψi,j | Δψ(mean) | on/off |
|---|---|---|---|---|---|---|---|
| DL-alanine | 1,2 | 1049.3 | −0.094(0.169) | 1024.6 | 0.180(0.093) | 1.340(0.876) | −0.071 |
| | 4,3 | | 0.086(0.041) | | −0.022(0.022) | −0.114(0.057) | −0.035 |
| | 3,1 | | 0.246(0.112) | 920.0 | 0.001(0.023) | −0.698(0.347) | −0.135 |
| | 4,3 | | 0.086(0.041) | | −0.009(0.010) | −0.091(0.046) | −0.058 |
| | 1,2 | | −0.094(0.169) | 851.8 | 0.169(0.082) | 0.876(0.919) | −0.049 |
| | 4,3 | | 0.086(0.041) | | 0.008(0.019) | −0.079(0.053) | −0.014 |
| L-alanine | 4,2 | 1050.4 | 0.004(0.048) | 1024.6 | 0.111(0.035) | 0.162(0.091) | −0.024 |
| | 1,2 | | −0.001(0.124) | 919.1 | 0.215(0.087) | 0.274(0.579) | −0.017 |
| | 4,3 | | 0.021(0.034) | 851.8 | −0.023(0.012) | −0.029(0.034) | −0.045 |
| DL-aspartic (amino) acid | 4,3 | 999.0 | 0.053(0.021) | 1071.8 | 0.021(0.011) | −0.020(0.018) | −0.070 |
| (1R)-(+)-camphor | 1,2 | 838.9 | 0.223(0.036) | 1044.9 | −0.056(0.016) | −0.214(0.053) | −0.527 |
| | 2,1 | | −0.040(0.070) | | 0.109(0.033) | 0.489(0.190) | −0.352 |
| (1S)-(−)-camphor | 4,3 | 935.5 | 0.019(0.005) | 1042.8 | 0.004(0.010) | −0.003(0.004) | −0.070 |
| D-fructose | 1,2 | 861.3 | 0.471(0.096) | 977.5 | −0.113(0.096) | −1.683(0.136) | 0.001 |
| | 1,2 | | 0.471(0.096) | 1082.3 | 0.145(0.055) | −0.554(0.373) | −0.248 |
| | 1,3 | | −0.070(0.017) | | −0.003(0.028) | 0.043(0.027) | −0.005 |
| | 1,4 | | 6.033(0.016) | | −0.008(0.014) | −0.022(0.012) | −0.045 |
| | 2,1 | | 0.014(0.164) | | 0.647(0.124) | 2.949(1.101) | −0.038 |
| D-glucose | 2,4 | 932.0 | 0.112(0.016) | 838.9 | 0.087(0.033) | −0.023(0.035) | −0.020 |
| L-histidine | 1,2 | 1025.6 | 0.132(0.075) | 997.5 | −0.001(0.037) | −0.273(0.184) | −0.069 |
| | 2,1 | | 0.269(0.175) | | −0.082(0.077) | −1.757(0.991) | −0.104 |
| | 3,4 | | −0.087(0.053) | 968.1 | 0.033(0.025) | 0.194(0.090) | −0.022 |
| | 3,4 | | −0.087(0.053) | 923.4 | 0.021(0.022) | 0.169(0.085) | −0.054 |
| | 2,1 | | 0.269(0.175) | 838.9 | −0.023(0.191) | −1.991(1.770) | −0.054 |
| | 2,3 | | 0.015(0.022) | | −0.024(0.015) | −0.033(0.018) | −0.002 |
| D-mannose | 1,2 | 899.3 | 0.333(0.133) | 1040.0 | −0.016(0.034) | −0.852(0.476) | −0.015 |
| | 2,3 | | 0.009(0.018) | 969.9 | −0.035(0.009) | −0.021(0.010) | −0.025 |
| L-serine | 1,2 | 945.2 | 0.319(0.147) | 1012.1 | 0.092(0.072) | −0.782(0.706) | −0.064 |
| | 2,3 | | 0.011(0.029) | | −0.025(0.005) | −0.031(0.022) | −0.037 |
| | 4,3 | | 0.091(0.037) | | 0.014(0.003) | −0.055(0.036) | −0.077 |
| | 4,3 | | 0.091(0.037) | 1039.5 | −0.017(0.025) | −0.102(0.053) | −0.053 |
| | —,— | | — | 854.7 | — | — | — |
| | —,— | | — | 920.0 | — | — | — |
| L-sorbose | 1,3 | 849.6 | 0.000(0.008) | 829.9 | 0.026(0.004) | 0.003(0.002) | −0.017 |
| | 3,2 | | −0.023(0.004) | | 0.006(0.004) | 0.002(0.001) | −0.001 |
| | 4,2 | | 0.006(0.006) | | 0.018(0.006) | 0.001(0.002) | −0.057 |
| | 4,3 | | 0.010(0.004) | | 0.021(0.004) | 0.001(0.001) | −0.057 |
| | 2,4 | | 0.013(0.008) | 992.1 | −0.033(0.033) | −0.051(0.029) | −0.034 |
| | 4,2 | | 0.006(0.006) | | 0.052(0.021) | 0.019(0.013) | −0.080 |
| | 1,3 | | 0.000(0.008) | 1048.2 | 0.204(0.034) | 0.168(0.031) | −0.048 |
| | 2,1 | | −0.147(0.049) | | 0.114(0.167) | 0.549(0.861) | −0.237 |
| | 3,4 | | 0.004(0.008) | | −0.074(0.033) | −0.077(0.029) | −0.002 |
| DL-tartaric acid | —,— | 1038.4 | — | 1094.1 | — | — | — |
| | —,— | | — | 982.3 | — | — | — |
| | 2,4 | | −0.081(0.059) | 887.3 | 0.036(0.027) | 0.211(0.112) | −0.075 |
| | 4,2 | | 0.075(0.042) | | 0.007(0.019) | −0.068(0.053) | −0.019 |
| L-tartaric acid | 1,3 | 1029.9 | 0.058(0.015) | 1082.3 | 0.188(0.030) | 0.105(0.029) | −0.001 |
| | 2,1 | | 0.208(0.126) | | 0.704(0.154) | 1.587(1.081) | −0.089 |
| | 3,1 | | 0.120(0.056) | | −0.310(0.092) | −1.101(0.270) | −0.074 |
| | 3,4 | | −0.039(0.014) | | 0.131(0.020) | 0.099(0.015) | −0.031 |
| | 4,3 | | −0.038(0.007) | | 0.011(0.013) | 0.003(0.005) | −0.060 |
| D-tartaric acid | 1,3 | 1029.9 | 0.081(0.035) | 1082.3 | 0.396(0.085) | 0.552(0.222) | −0.080 |
| | 4,3 | | 0.002(0.014) | | 0.062(0.030) | 0.011(0.032) | −0.198 |
| L-tryptophan | 4,3 | 833.3 | 0.036(0.020) | 1005.0 | −0.006(0.011) | −0.020(0.013) | −0.028 |
| L-tyrosine | 3,4 | 925.1 | 0.117(0.063) | 878.7 | 0.003(0.020) | 0.190(0.112) | −0.048 |
| | 1,2 | | 0.299(0.148) | 1095.3 | −0.007(0.098) | −1.210(0.838) | −0.074 |
| | 4,3 | | −0.041(0.023) | | 0.049(0.024) | 0.076(0.029) | −0.073 |
| | —,— | | — | 1041.7 | — | — | — |
| | —,— | | — | 984.3 | — | — | — |
| | —,— | | — | 939.8 | — | — | — |
| | —,— | | — | 897.7 | — | — | — |

Generally, the Mueller matrix properties of the organic materials listed in Table 3 provide that (1) none of the organic material diagonal elements exhibit negative correlation coefficients, excluding all as feature data; (2) the Vibrational Circular Dichroism (VCD) corner elements of $\psi_{14}$ and $\psi_{41}$ (elements that transform the handedness of circular polarizations) are weak, and except for one measurement, are not detectable as feature data, and should normally not be used; and, (3) elements $\psi_{12}$, $\psi_{21}$, $\psi_{13}$, $\psi_{31}$, $\psi_{24}$, $\psi_{42}$, $\psi_{34}$, and $\psi_{43}$ appear collectively as the most significant detection elements. The data in Table 3 are recast into an appropriate format for neural network modeling and pattern recognition of the analytes.

The laboratory photopolarimeter designed for these feasibility tests used various software and hardware modules built and written for specific functions including (1) data entry (type of experiment to run with input parameters), (2) automation and control of optics (laser switching, POL- PEM permutations), (3) automatic gain control in the MCT detector amplifier, (4) adjusting PEM peak retardation per laser wavelength, (5) stepping backscattering angle of the sample, (6) reference frequency synthesis to the analog data acquisition unit, (7) scattergram signal acquisition as a function of beam wavelength and backscattering angle, (8) signal conditioning, (9) sweeping channel outputs, storage and preprocessing of element data, (10) real-time graphics display, and other functions.

Figure 7:
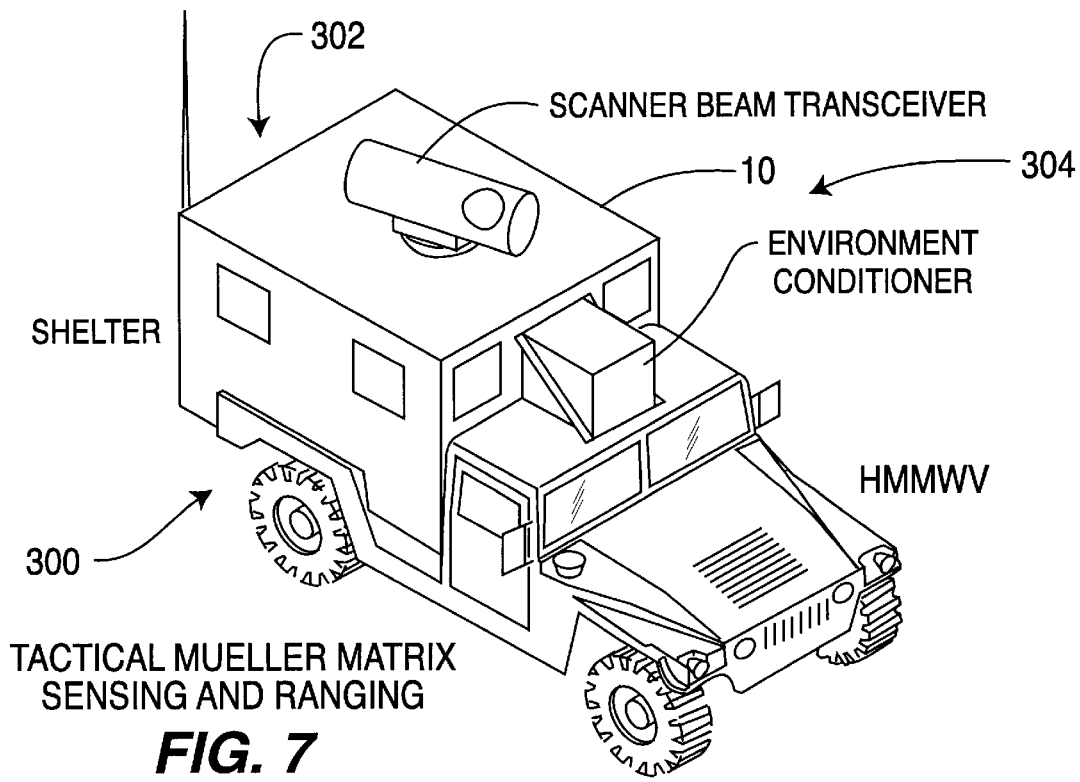
FIG. 7 shows the present invention mounted on a tactical military vehicle movable platform.

As seen in FIG. 7, the apparatus 10 may be mounted or supported on a movable platform 300 to be used in field operations as a tactical sensing and ranging system. Preferably the movable platform comprises a tactical military vehicle. When used as a Tactical Mueller Matrix Sensor (TMMS) 304, the present invention may be assembled and housed in a modified S-788/G military shelter 302. A cylindrical scanner with 12 inch clear aperture opening having dual azimuth and polar angle computer-actuated rotation capability may be transported on a High Mobility Multipurpose Wheeled Vehicle (HMMWV) 300 for mobility, with a towed trailer-mounted 15 kilowatt diesel engine generator providing power. Alternatively, a 30-kilowatt in-line power system using conventional internal combustion engine to turn the generator may be used. Power is supplied to the photopolarimeter optics and electronics, on board environmental monitoring and conditioning, communication, computer, and lighting systems by the generator unit. The absorption sensitivity is found in difference matrix element data that provides the basis for a tactical standoff detection system based on infrared polarized backscattering.

The scanner and beam transceiver unit mounted on the roof of the shelter 302 may be obtained from DFM Engineering, Inc. of Longmont, Colo. It has two flat mirrors with 12 inch diameter clear apertures in an elevation over azimuth mount design. Backscattered radiance is reflected 90° by the entrance or elevation mirror to the azimuth mirror, where it is reflected another 90° straight down through the roof of the shelter 302 and directed to the beam condenser 168 preceding the photopolarimeter, shown in FIG. 2. DC servomotors drive both azimuth and polar axes with encoders for position accuracy. The TMMS 304 travels to a suitable location, powers up and stabilizes the on board optical and electrical systems, scans-and-records data and downlinks reports to a remote receiving station. The shelter 302 may be decoupled from the HMMWV vehicle 300 prior to starting the field operations.

The TMMS 304 uses Variable Beam Splitters (VBSs) for producing a sequential train of pulsed energies in the photopolarimeter's incident beam. The VBS pulsing mechanism 132, shown in FIGS. 2 and 3, has prism optics labeled as V1 202 and V2 204, which are shown in FIG. 3. The VBS cubes are ZnSe crystals cleaved along their diagonals and separated by an air gap distance made to oscillate between bounds less than and greater than the wavelength of incident laser light ($\lambda$). When the gap distance is less than $\lambda$, or presumably zero, an incident laser beam propagates onward through the cube undisturbed. The reflection is frustrated at the first-half prism-to-air interface and energy flows through the infinitesimal gap to the second-half cube material of higher refractive index. The principle of frustrated internal reflection is analogous to tunneling in quantum mechanics. The minimum gap condition sets the VBS to a transmission mode T=1. A gap distance greater than $\lambda$ causes total internal reflection of the incident beam since the laser beam angle of incidence exceeds the critical angle at the first-half prism-to-air interface, and no tunneling of energy occurs across the air gap. This is the VBS reflection mode R=1.

The intensities of the three laser beams sent into the VBS switching system shown in FIG. 3 are separately adjusted by Ge linear polarizer optics (P) succeeding each laser tube, shown in FIG. 2. The laser tube windows are orientated at the Brewster angle so that output beams are all linearly polarized. The duration and sequencing of the beams by the VBS unit may be illustrated as shown in Table 4.

TABLE 4

INCIDENT BEAM PULSE SEQUENCES (SA, PPR, BD) OF FIG. 5

| | Variable Beam Splitter V1 | |
|---|---|---|
| | T = 1 | R = 1 |
| Variable Beam | T = 1 (L3, L1, L2) | (L1, L3, L2) |
| Splitter V2 | R = 1 (L3, L2, L1) | (L2, L3, L1) |
| VBS ACTIVATION CYCLE → V1:V2 | | |
| (T:T_T:R_R:T_T:T_T:R_R:R_ . . .) ∀ T = 1, R = 1. | | |

T=1 represents transmission, or the frustrated internal reflection, and R=1 reflection, or total internal reflection, modes of V1 and V2 of FIG. 3. The parenthetical entries in Table 4 suggest destination of the three beams (L1, L2, and L3) during a VBS cycle. In FIG. 3, SA is the spectrum analyzer optics; PPR is the output beam to incident beam monitor of the detector PCD1, photopolarimeter optics, and scatterer, and BD is the beam dump. The VBS activation cycle shows that in the first period of beam cycling, both V1 and V2 are in transmission modes. In successive periods of the cycle, V2 switches into a reflection mode, V1 and V2 next switch into reflection and transmission modes, respectively, and continue as such. This produces the sequence of pulses . . . $\lambda_1 \lambda_2 \lambda_3$ . . . in the PPR beam. Accordingly, the scattering target is sequentially irradiated with three separate square-pulse energies whose duration and intensity are independently adjusted by the use of electrostrictive actuators that move the VBS cubes, and by rotations of linear polarizer optics P preceding the VBS unit, respectively.

Ranging of the scatterer may be provided to the TMMS. Laser L1 of FIG. 2 may be chosen as the ranging beam, requiring V1 and V2 prisms to be fixed in transmission modes. The incident beam L1 is polarization-modulated and recorded at amplifier detector/amplifier PCD1/A1. The beam-backscattered radiance is collected by condenser optics BC, and sent to and recorded at detector/amplifier PCD2/A2. A comparator circuit C analyzes the phase difference or temporal shift between the sinusoidal outputs of A1 and A2. The shift is proportional to beam time-of-flight and can be resolved in kilometers (km) distances if modulation in the incident beam PEM is increased to approximately 100 kHz rates or above.

EXAMPLE 1

Several polarization-modulated $CO_2$ laser beams of unequal energy irradiated crystalline samples composed of biological building block organic materials, such as amino acids and sugars in wafer form. Measurements were taken photopolarimetrically of the backscattering of the laser beam energy from the compounds. The $CO_2$ continuous-wave beams were tuned to absorption by the sample, partly exciting the scatterer compounds into fundamental modes of molecular vibration. Additionally, a single beam was de-tuned off vibration resonance of the scatterer compounds in a group of chopped incident beam pulses. The difference elements of the matrix field, on-then-off resonance beam backscattering, were filtered to model a neural network pattern recognition system for detection of the known organic compounds of the scatterer compounds. Filtration of the backscattering of the organic compounds provided a matrix of normalized and scaled difference elements that were anti-correlated and statistically disjointed under the resonance/non-resonance beam scattering conditions, providing signatures for the known compounds. The signatures were relatively weak in intensity, which were detected by lock-in amplification electronic circuits. The materials were shown to empirically determine that elastic polarized scattering, on-then-off vibration beam resonance energies, produce a form of susceptive difference Mueller matrix field of elements which serve as features for biological identification. Additionally, the backscattering sensor data consistently provided distinctive features for biological materials, allowing increased accuracy and sensitivity in standoff contamination detection.

EXAMPLE 2

Four polarization-modulated infrared laser beams are tuned to distinct energies and sequentially directed against a natural object that has its surface coated by CBMs of military interest. The apparatus of the present invention irradiates the surface with infrared radiation that is calibrated at an energy level to interrogate the surface for specific CBMs. The specific CBMs are elucidated from the background matter by snap-shots of infrared Mueller matrices for the specific CBMs by backscattering multiple pulsating incident laser beams.

EXAMPLE 3

Example 2 is performed against a man-made surface completely composed of a CBM of military interest.

EXAMPLE 4

Vibration Circular Dichroism (VCD) corner elements were investigated for use as feature data. Elements $\psi_{14}$ and $\psi_{41}$ were simultaneously measured of the chiral compound camphor at laser energies coinciding with midinfrared molecular vibration molecular vibration in the camphor molecule. Measurements were made quickly because of camphor's high sublimation rate over the irradiated area. The corner element signals emerged opposite in phase and amplitude only at extreme gain levels of the data system's two phase-sensitive detectors and at increased laser intensity of irradiation. The data collected indicated that the intensity of beam and the sensitivity of the instrument were required to be significantly increased for clearly discerning VCD in the corner elements by the system. MCT detectivity would be required to be increased by at least one order of magnitude.

It should be understood that the foregoing summary, detailed description, examples and drawings of the present invention are not intended to be limiting, but are only exemplary of the inventive features which are defined in the claims.

What is claimed is:

1. An apparatus for remotely sensing for the presence of a material that possesses molecular vibrational bands in the infrared electromagnetic region in a sample comprising:

interrogation component means including infrared radiation source means for irradiating the sample at a predetermined exciting energy to said material's vibrational bands to vibrationally excite said material, and for irradiating the sample at a reference energy different from said predetermined exciting energy;

collection component means for gathering backscattering radiations from said sample as the sample is irradiated at each of the exciting energy and the reference energy by said radiation source means;

optical analysis component means for converting the gathered backscattering radiations into a difference Mueller matrix representing a subtractive comparison of said backscattering radiations; and filter component means for receiving said difference Mueller matrix from the optical analysis component means and comparing it to a predetermined difference Mueller matrix of the material to thereby determine the presence of the material in the sample.

2. The apparatus of claim 1 wherein:

said infrared radiation source means includes a first infrared laser source for applying said predetermined exciting energy to said sample, and second infrared laser source for applying said reference exciting energy to said sample, wherein applications of energy are sequentially applied to the sample.

3. The apparatus of claim 2 wherein:

said optical analysis component means converts the gathered backscattering radiations into intermediate Mueller matrices at the exciting and reference energies and produces said difference Mueller matrix derived from a subtraction of said intermediate Mueller matrices.

4. The apparatus of claim 2 wherein:

said infrared radiation source means includes a third infrared laser source for a applying another exciting energy to said sample to vibrationally excite the material in a second vibrational mode;

said optical analysis component means converts the gathered backscattering radiations resulting from application of said another exciting energy into another intermediate Mueller matrix and produces another difference Mueller matrix derived from a subtraction of said another intermediate Mueller matrix and the reference energy Mueller matrix; and said filter component means also receives said another difference Mueller matrix from the optical analysis component means and compares it to another predetermined difference Mueller matrix of the material to thereby determine the presence of the material in the sample.

5. The apparatus of claim 2 wherein:

said interrogation component means further including means to polarization-modulate the infrared laser sources.

6. The apparatus of claim 5 wherein;

each of said infrared laser sources emits lasers in the middle infrared region.

7. The apparatus of claim 1 wherein:

said collection component means includes a beam compression telescope to gather the backscattering radiations.

8. The apparatus of claim 1 wherein said optical analysis component means includes a phase comparator means for determining range to the sample.

9. The apparatus of claim 1 wherein, reference energy applied to the sample is detuned from the material's vibrational bands to preclude the material from achieving a vibrationally excited state during application of the reference energy.

10. A method for sensing for the presence of a material that possesses molecular vibrational bands in the infrared electromagnetic region in a sample comprising the steps of:

irradiating the sample with an infrared radiation laser source at a predetermined exciting energy to said material's vibrational bands to vibrationally excite said material;

gathering backscattering radiations from said sample as the sample is irradiated at the predetermined exciting energy;

irradiating the sample with an infrared radiation laser source at a reference energy different from said predetermined exciting energy;

gathering backscattering radiations from said sample as the sample is irradiated at the reference energy;

converting the gathered backscattering radiations into a difference Mueller matrix representing a subtractive comparison of said backscattering radiations; and comparing the resultant difference Mueller matrix to a predetermined difference Mueller matrix of the material to thereby determine the presence of the material in the sample.

11. The method of claim 10 further comprising the step of converting the gathered backscattering radiations to scattergrams containing physical and geometric information describing the sample in elastic scattering as an intermediate step toward achieving the difference Mueller matrix.

12. The method of claim 10 further comprising the step of determining distance to the sample by comparing modulation between the first infrared radiation laser source and its resultant backscattering radiation.

13. The method of claim 10 further comprising the step of irradiating the sample with an infrared radiation laser source at another exciting energy to vibrationally excite the material in a second vibrational mode;

gathering backscattering radiations from said sample as the sample is irradiated at each of the another exciting energy and the reference energy;

converting the gathered backscattering radiations into a difference Mueller matrix representing a subtractive comparison of said backscattering radiations; and comparing the resultant difference Mueller matrix to another predetermined difference Mueller matrix of the material to thereby determine the presence of the material in the sample.

\* \* \* \* \*